(12) United States Patent
Kitamura

(10) Patent No.: US 8,885,237 B2
(45) Date of Patent: Nov. 11, 2014

(54) HOLOGRAM PREPARATION METHOD, HOLOGRAM AND SECURITY MEDIUM USING SUCH HOLOGRAM

(75) Inventor: Mitsuru Kitamura, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 467 days.

(21) Appl. No.: 13/003,265

(22) PCT Filed: Jul. 8, 2009

(86) PCT No.: PCT/JP2009/062419
§ 371 (c)(1),
(2), (4) Date: Jan. 7, 2011

(87) PCT Pub. No.: WO2010/005016
PCT Pub. Date: Jan. 14, 2010

(65) Prior Publication Data
US 2011/0117478 A1      May 19, 2011

(30) Foreign Application Priority Data

Jul. 9, 2008    (JP) .................................. 2008-179310

(51) Int. Cl.
*G03H 1/08* (2006.01)
*B42D 15/00* (2006.01)
*G03H 1/00* (2006.01)
*B42D 25/00* (2014.01)
*G03H 1/22* (2006.01)

(52) U.S. Cl.
CPC .......... *G03H 1/08* (2013.01); *G03H 2001/2257* (2013.01); *G03H 2210/55* (2013.01); *B42D 15/0013* (2013.01); *G03H 2240/13* (2013.01); *G03H 1/0891* (2013.01); *G03H 1/0011* (2013.01); *G03H 2210/52* (2013.01); *G03H 1/2249* (2013.01); *B42D 2035/22* (2013.01); *G03H 1/00* (2013.01); *G03H 2210/30* (2013.01); *B42D 15/105* (2013.01)
USPC ............................................................ 359/9

(58) Field of Classification Search
USPC .......................................................... 359/2, 9
See application file for complete search history.

(56) References Cited

U.S. PATENT DOCUMENTS 5,886,798 A * 3/1999 Staub et al. ....................... 359/2

FOREIGN PATENT DOCUMENTS

| JP | 11-024541 A | 1/1999 |
| JP | 2000-214751 A | 8/2000 |
| JP | 2002-072837 A | 3/2002 |
| JP | 2003-228270 A | 8/2003 |
| JP | 2004-138688 A | 5/2004 |
| JP | 2005-215570 A | 8/2005 |

\* cited by examiner

*Primary Examiner* — Jennifer L. Doak
(74) *Attorney, Agent, or Firm* — Sughrue Mion, PLLC

(57) ABSTRACT

A method of preparing a hologram where an original image is recorded as interference fringes on a predetermined recording surface by arithmetic operations using a computer, the method including: a step of defining an original image formed as a three-dimensional image, a hologram recording plane for recording the original image, and reference light to be irradiated onto the hologram recording plane, a step of defining a large number of arithmetic operation points on the hologram recording plane and arithmetically determining the intensity of the interference wave formed by an object light beam emitted from each object and the reference light for each of the arithmetic operation points and a step of preparing physical interference fringes on a medium on the basis of the intensity distribution of interference wave obtained on the recording plane in the arithmetically determining step, the front-most part of the three-dimensional image being arranged near the hologram recording plane at the time of defining the original image.

14 Claims, 21 Drawing Sheets binary image

U(x,y)

binarization interference wave
intensity
distribution

Q(x,y)
×

FIG.16 large light source

| depth-directional arrangement position Z [mm] | character height H [mm] | | | | | | | | | |
|---|---|---|---|---|---|---|---|---|---|---|
| | 0.2 | | 0.4 | | 0.8 | | 1.6 | | 3.2 | |
| | Z/H | evaluation | Z/H | evaluation | Z/H | evaluation | Z/H | evaluation | Z/H | evaluation |
| 1.6 | 8 | × | 4 | ○ | 2 | ○ | 1 | ○ | 0.5 | ○ |
| 0.8 | 4 | ○ | 2 | ○ | 1 | ○ | 0.5 | ○ | 0.25 | ○ |
| 0.4 | 2 | ○ | 1 | ○ | 0.5 | ○ | 0.25 | ○ | 0.125 | ○ |
| -0.2 | -1 | ○ | -0.5 | ○ | -0.25 | ○ | -0.125 | ○ | -0.0625 | ○ |
| -0.3 | -1.5 | ○ | -0.75 | ○ | -0.375 | ○ | -0.1875 | ○ | -0.09375 | ○ |
| -0.4 | -2 | ○ | -1 | ○ | -0.5 | ○ | -0.25 | ○ | -0.125 | ○ |
| -0.6 | -3 | ○ | -1.5 | ○ | -0.75 | ○ | -0.375 | ○ | -0.1875 | ○ |
| -0.8 | -4 | ○ | -2 | ○ | -1 | ○ | -0.5 | ○ | -0.25 | ○ |
| -1.2 | -6 | × | -3 | ○ | -1.5 | ○ | -0.75 | ○ | -0.375 | ○ |
| -1.6 | -8 | × | -4 | ○ | -2 | ○ | -1 | ○ | -0.5 | ○ |
| -2.4 | -12 | × | -6 | × | -3 | ○ | -1.5 | ○ | -0.75 | ○ |
| -3.2 | -16 | × | -8 | × | -4 | ○ | -2 | ○ | -1 | ○ |
| -4.8 | -24 | × | -12 | × | -6 | × | -3 | ○ | -1.5 | ○ |
| -6.4 | -32 | × | -16 | × | -8 | × | -4 | ○ | -2 | ○ |
| -9.6 | -48 | × | -24 | × | -12 | × | -6 | × | -3 | ○ |
| -19.2 | -96 | × | -48 | × | -24 | × | -12 | × | -6 | × |
| -25.6 | -128 | × | -64 | × | -32 | × | -16 | × | -8 | × |

FIG.20

| parallel light | | character height H [mm] | | | | | | | | |
|---|---|---|---|---|---|---|---|---|---|---|
| | | 0.2 | | 0.4 | | 0.8 | | 1.6 | | 3.2 | |
| | | Z/H | evaluation | Z/H | evaluation | Z/H | evaluation | Z/H | evaluation | Z/H | evaluation |
| depth-directional arrangement position Z [mm] | 1.6 | 8 | — | 4 | ○ | 2 | ○ | 1 | ○ | 0.5 | ○ |
| | 0.8 | 4 | — | 2 | ○ | 1 | ○ | 0.5 | ○ | 0.25 | ○ |
| | 0.4 | 2 | — | 1 | ○ | 0.5 | ○ | 0.25 | ○ | 0.125 | ○ |
| | −0.2 | −1 | — | −0.5 | ○ | −0.25 | ○ | −0.125 | ○ | −0.0625 | ○ |
| | −0.3 | −1.5 | — | −0.75 | ○ | −0.375 | ○ | −0.1875 | ○ | −0.09375 | ○ |
| | −0.4 | −2 | — | −1 | ○ | −0.5 | ○ | −0.25 | ○ | −0.125 | ○ |
| | −0.6 | −3 | — | −1.5 | ○ | −0.75 | ○ | −0.375 | ○ | −0.1875 | ○ |
| | −0.8 | −4 | — | −2 | ○ | −1 | ○ | −0.5 | ○ | −0.25 | ○ |
| | −1.2 | −6 | — | −3 | ○ | −1.5 | ○ | −0.75 | ○ | −0.375 | ○ |
| | −1.6 | −8 | — | −4 | ○ | −2 | ○ | −1 | ○ | −0.5 | ○ |
| | −2.4 | −12 | — | −6 | ○ | −3 | ○ | −1.5 | ○ | −0.75 | ○ |
| | −3.2 | −16 | — | −8 | ○ | −4 | ○ | −2 | ○ | −1 | ○ |
| | −4.8 | −24 | — | −12 | ○ | −6 | ○ | −3 | ○ | −1.5 | ○ |
| | −6.4 | −32 | — | −16 | ○ | −8 | ○ | −4 | ○ | −2 | ○ |
| | −9.6 | −48 | — | −24 | × | −12 | ○ | −6 | ○ | −3 | ○ |
| | −19.2 | −96 | — | −48 | × | −24 | × | −12 | ○ | −6 | ○ |
| | −25.6 | −128 | — | −64 | × | −32 | × | −16 | ○ | −8 | ○ |

HOLOGRAM PREPARATION METHOD, HOLOGRAM AND SECURITY MEDIUM USING SUCH HOLOGRAM

TECHNICAL FIELD

The present invention relates to a hologram preparation method and, more particularly, the present invention relates to a hologram preparation method by which a deep three-dimensional image can be observed under the light from a large light source such as a fluorescent lamp, a hologram prepared by the method and a security medium using such a hologram.

BACKGROUND ART

Techniques of bonding a hologram to a voucher or a credit card or integrally forming a voucher or a credit card with a hologram for forgery prevention are known.

With a known technique, a hologram is prepared by dividing a laser beam into two beams and irradiating one of the laser beams onto an object to be imaged that provides the basis of a three-dimensional image so as to make scattered and reflected light thereof get to a hologram recording material and not irradiating the other laser beam onto the object to be imaged but causing the other laser beam to directly get to the hologram recording material such that the light beams following the two different routes interfere with each other on the hologram recording material and finally recording the interference fringes produced as a result on the hologram recording material. With such a technique, however, a real object to be imaged needs to be provided and hence it is not possible to prepare a hologram of an object to be imaged that cannot be provided as real object (such as character strings floating in air).

On the other hand, computer generated holograms (CGHs) have recently been finding practical applications. A CGH is prepared by providing an object to be imaged with shape and material data for a three-dimensional CG (computer graphics), generating a pattern of interference fringes by means of a computer simulation as in the case of the interference fringes recorded on a hologram recording material by a known hologram preparing method, and micro-fabricating the generated pattern of interference fringes. Since a hologram of an object can be prepared by a technique of preparing a CGH even if the object cannot be provided as real object, CGHs are attracting attention as holograms having a high anti-forgery effect (see Patent Document 1).

While a three-dimensional image that is hardly blurred all the way from the front side to the rear side of a hologram can be observed when the hologram is irradiated with light from a point light source or with parallel rays of light, the image is blurred both at the front side and at the rear side of the hologram particularly at points distant from the hologram so that a clear three-dimensional image cannot be observed when the hologram is irradiated with light from a large light source (that produces a wide range of incident angle of light striking the hologram).

On the other hand, holograms are employed for anti-forgery applications and design applications because there is a demand for strange appearances of holograms that a deep three-dimensional image can be observed by means of a physically two-dimensional hologram medium.

The effect of a strange appearance of a hologram is emphasized when a deep three-dimensional image can be observed. However, as pointed out above, the image is blurred both at the front side and at the rear side of the hologram particularly at points distant from the hologram when the hologram is irradiated with light from a large light source. Therefore, a contrary result is produced when an infinitely deep three-dimensional image is achieved.

Techniques of preparing a computer generated hologram by making a three-dimensional image 10' project frontward and rearward by a substantially same quantity relative to the hologram recording plane 20 as shown in FIG. 22 have been practiced in order to produce a deep three-dimensional image with a minimized level of blur (see Patent Document 2).

PRIOR-ART DOCUMENTS

Patent Documents

[Patent Document 1] JP-A-2000-214751
[Patent Document 2] JP-A-11-024541
[Patent Document 3] JP-A-2002-072837
[Patent Document 4] JP-A-2005-215570
[Non-Patent Document 1] 3D Image Conference Proceedings CD-ROM (Jun. 30-Jul. 1, 1999, at Kogakuin University Shinjuku Campus), "Image Type Binary CGH by EB Imaging (3)—The Enhancement of Three-Dimensional Effect by Hidden Surface Removal/Shadowing"

SUMMARY OF THE INVENTION

Problem to be Solved by the Invention

When a three-dimensional image is arranged so as to project frontward and rearward by a substantially same quantity relative to the hologram plane, any extreme blur is suppressed as a whole. However, the part projecting frontward is blurred most so that it is difficult to produce a satisfactory three-dimensional impression that the front side appear more clearly than the rear side as in the case of observing a real object.

In view of the above-identified circumstances, therefore, the object of the present invention is to provide a hologram preparation method of preparing a hologram that is simple and excellent from the viewpoint of design and security and offers a comfortable appearance of an image and a three-dimensional impression like those of a real object, such a hologram and a security medium using such a hologram.

Means for Solving the Problem

According to the present invention, the above object is achieved by providing a hologram preparation method of preparing a hologram where an original image is recorded as interference fringes on a predetermined recording surface by way of arithmetic operations using a computer, the method including: a step of defining an original image formed as a three-dimensional image, a hologram recording plane for recording the original image and reference light to be irradiated onto the hologram recording plane; a step of defining a large number of arithmetic operation points on the hologram recording plane and arithmetically determining the intensity of the interference wave formed by an object light beam emitted from each object and the reference light for each of the arithmetic operation points; and a step of preparing physical interference fringes on a medium on the basis of the intensity distribution of interference wave obtained on the recording plane in the arithmetically determining step, the front-most part of the three-dimensional image being arranged near the hologram recording plane at the time of defining the original image.

Preferably, the front-most part of the three-dimensional image is arranged within about ±1 mm in front of the hologram recording plane.

Preferably, the rear-most part of the three-dimensional image is arranged within about 2 mm to 20 mm at the back of the hologram recording plane.

Preferably, the range from the front-most part to the rear-most part of the three-dimensional image is about 2 mm or more.

Preferably, the three-dimensional image is formed by a character string having a depth.

Preferably, the character string is formed by a ring-shaped character string.

Preferably, the ring-shaped character string is arranged so as to satisfy the conditional formula (1) below:

$$-4 \leq Zf/H \leq 4 \quad (1),$$

where $Zf$ is the depth-directional arrangement position of the front-most part of the ring-shaped character string and $H$ is the height of the ring-shaped character string.

Preferably and alternatively, the ring-shaped character string is arranged so as to satisfy the conditional formula (2) below:

$$|Zf/H| \leq -Zr/H \quad (2),$$

where $Zf$ is the depth-directional arrangement position of the front-most part of the ring-shaped character string, $Zr$ is the depth-directional arrangement position of the rear-most part of the ring-shaped character string, $H$ is the height of the ring-shaped character string, and

| | is the symbol for expressing an absolute value.

Preferably and alternatively, the ring-shaped character string is arranged so as to satisfy the conditional formula (4) below:

$$-16 \leq Zr/H \leq -6 \quad (4),$$

where $Zr$ is the depth-directional arrangement position of the rear-most part of the ring-shaped character string and $H$ is the height of the ring-shaped character string.

According to the present invention, there is also provided a hologram prepared by the above-described hologram preparation method.

Preferably, in a hologram according to the present invention, an image is reproduced with the front-most part arranged within ±1 mm in front of a hologram recording plane and the rear-most part arranged within 2 mm to 20 mm at the back of the hologram recording plane, the range from the front-most part to the rear-most part being 2 mm or more.

Preferably, in a hologram according to the present invention, an image of ring-shaped character string satisfying the conditional formulas (1) and (2) shown below is reproduced:

$$-4 \leq Zf/H \leq 4 \quad (1)$$

and $$|Zf/H| \leq -Zr/H \quad (2),$$

where $Zf$ is the depth-directional arrangement position of the front-most part of the ring-shaped character string, $Zr$ is the depth-directional arrangement position of the rear-most part of the ring-shaped character string, $H$ is the height of the ring-shaped character string, and

| | is the symbol for expressing an absolute value.

Preferably, an image of a ring-shaped character string satisfying the conditional formula (4) shown below is reproduced:

$$-16 \leq Zr/H \leq -6 \quad (4),$$

where $Zr$ is the depth-directional arrangement position of the rear-most part of the ring-shaped character string and $H$ is the height of the ring-shaped character string.

A security medium according to the present invention uses a hologram as defined above.

Advantages of the Invention

Thus, according to the present invention, it is possible to prepare a hologram that is excellent from the viewpoint of design and security and has a high anti-forgery effect. Additionally, since a hologram according to the present invention has a wide range of depth, the hologram can reproduce an image that offers a satisfactory three-dimensional impression like a real object. Still additionally, since the front-most character string of a hologram according to the present invention can be read when irradiated by a large light source, the image of the hologram reproduces is easy to observe. The present invention can further enhance the anti-forgery effect because character string arranged at the back that cannot be read out by the prior art when irradiated by a large light source can now be read out when irradiated by an appropriate light source such as a point light source.

Additionally, the design and the security of a security medium are enhanced further by using a hologram prepared in this way for a security medium.

BRIEF DESCRIPTION OF THE DRAWINGS

FIG. 16 is a table of determined readabilities of characters when a large light source is used.

FIG. 20 is a table of determined readabilities of characters when parallel light is used.

EXPLANATION OF REFERENCE SYMBOLS

Figure 1:
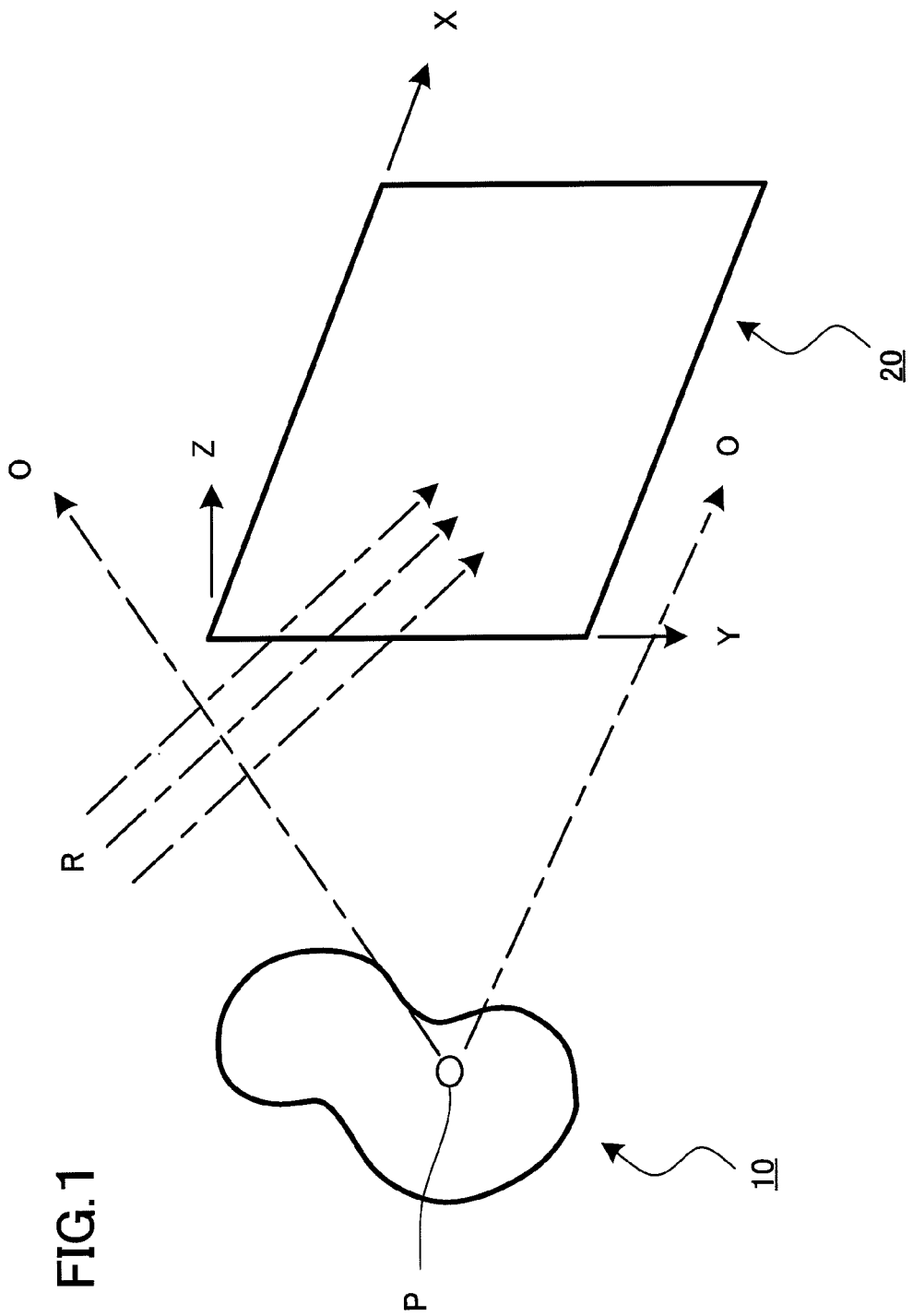
FIG. 1 is a schematic perspective view of a computer generated hologram illustrating the recording concept thereof.

10: original image
10': three-dimensional image
110: ring-shaped character string
20: recording plane

BEST MODE FOR CARRYING OUT THE INVENTION

Now, the computer generated hologram of this embodiment will be described below by referring to the drawings. FIGS. 1 through 8 illustrate the principle of preparation of a computer generated hologram 1.

In this embodiment, a method of recording an original image 10 as interference fringes on a recording plane 20 as shown in FIG. 1 is employed. For the convenience of explanation, an XYZ three-dimensional coordinate system is defined as shown in FIG. 1 and it is assumed that the recording plane 20 is placed on the XY plane. When an optical technique is adopted, an object to be recorded is provided as original image 10. Object light O emitted from an arbitrarily selected point P on the original image 10 proceeds toward the entire recording plane 20. On the other hand, reference light R is irradiated onto the recording plane 20 so that interference fringes of the object light O and the reference light R are recorded on the recording plane 20.

Figure 2:
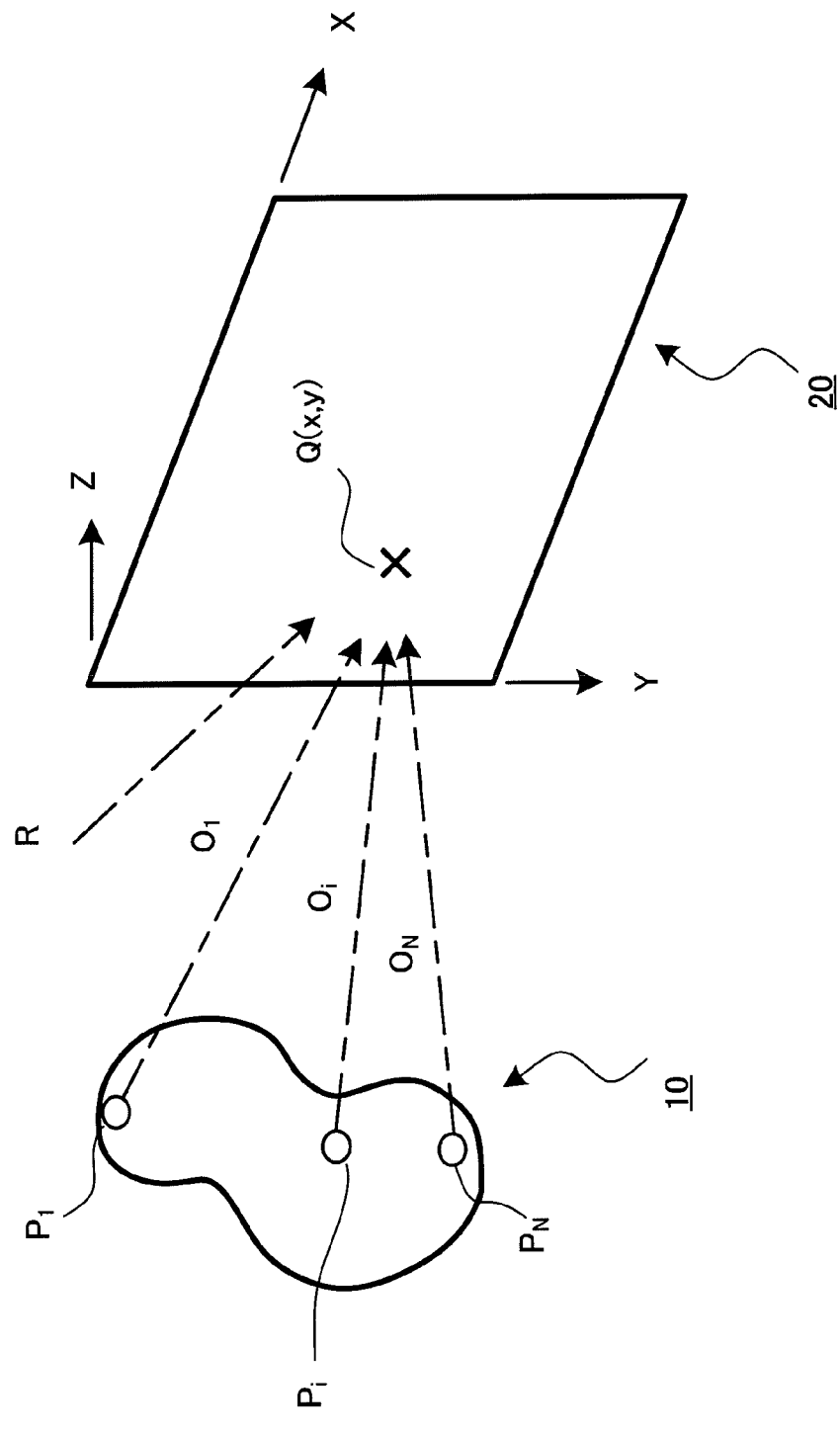
FIG. 2 is a schematic illustration of a concrete example based on the concept of arithmetic processing of FIG. 1.

To prepare a computer hologram on the recording plane 20, the original image 10, the recording plane 20 and the reference light R are defined as data on a computer and the interference wave intensity is determined at each position on the recording plane 20. More specifically, as shown in FIG. 2, the original image 10 is handled as a set of N point light sources $P_1, P_2, P_3, \ldots P_i, \ldots P_N$ and object light beams $O_1, O_2, O_3, \ldots, O_i, \ldots O_N$ from the respective point light sources are assumed to proceed to respective arithmetic operation points $Q(x, y)$, while the reference light R is irradiated toward the arithmetic operation points $Q(x, y)$ at the same time. Then, arithmetic operations for determining the amplitude intensity of each of the arithmetic operation points $Q(x, y)$ of the interference wave generated as a result of interference of the N object light beams $O_1$ through $O_N$ and the reference light R. Object light and reference light are normally treated as monochromatic light for the arithmetic operations. A large number of arithmetic operation points are defined on the recording plane 20 as a function of the required degree of resolution and the intensity distribution of the interference wave is obtained on the recording plane 20 by way of arithmetic operations for determining the amplitude intensity of each of the arithmetic operation points.

More specifically, assume that the coordinates of a point light source arranged on an object is $P_i (x_i, y_i, z_i)$ and the energy that the point light source has is $4\pi A_i^2$, the synthesized complex amplitude value $O(x, y)$ of the object light beam at the position of the arithmetic operation point $Q(x, y)$ on the XY plane can be determined by formula (A1) shown below.

[Mathematic formula 1]

$$O(x, y) = \sum_{i=1}^{N} \frac{A_i}{r_i(x, y)} \exp(jkr_i(x, y) + j\phi_i), \quad (A1)$$

where $A_i$ is the coefficient representing the amplitude of the object light beam emitted from the point light source $P_i$, $r_i(x, y)$ is the distance between the point light source $P_i$ and the arithmetic operation point $Q(x, y)$ given by formula (A2).

[Mathematic formula 2]

$$r_i(x,y) = \sqrt{(x-x_i)^2 + (y-y_i)^2 + z_i^2} \quad (A2)$$

In other words, the term of $A_i/r_i(x, y)$ in the formula (A1) shows the amplitude attenuation by distance.

The next term described in the form of an exponential function in the formula (A1) is a term that shows the periodic amplitude fluctuations of the object light beam in the form of complex amplitude, where j is the imaginary unit, $k = 2\pi/\lambda$ when $\lambda$ is the wavelength and $\phi_i$ is the initial phase of the point light source at $P_i$. Note that the term $kr_i(x, y)$ shows the light path length and the synthesized complex amplitude value of the object light beam at the arithmetic operation point $Q(x, y)$ is given by adding the initial phase $\phi_i$ to the light path length. Also note that the initial phase $\phi_i$ can be defined randomly for each object light beam.

If the incident vector, the amplitude and the phase at the coordinate origin of the reference light R that is parallel light are respectively (Rx, Ry, Rz), $A_R$ and $\phi_R$, the complex amplitude value $R(x, y)$ of the reference light R at the position of arithmetic operation point $Q(x, y)$ can be determined by formula (A3) shown below.

[Mathematic formula 3]

$$R(x, y) = A_R \exp\left(jk \frac{R_x \cdot x + R_y \cdot y}{\sqrt{R_x^2 + R_y^2 + R_z^2}} + \phi_R\right) \quad (A3)$$

Thus, since both the synthesized amplitude intensity $O(x, y)$ of object light given by the formula (A1) and the complex amplitude value $R(x, y)$ of reference light given by the formula (A3) are complex amplitude intensities, the intensity I(x, y) of the interference fringes at the position of the arithmetic operation point Q(x, y) is determined by formula (A4) shown below.

[Mathematic formula 4]

$$I(x,y)=|O(x,y)+R(x,y)|^2 \quad (A4)$$

A hologram where the original image 10 is recorded as interference fringes can be prepared by forming a physical shading pattern and an embossed pattern on an actual medium on the basis of the image data indicating such an intensity distribution. An electron beam drawing apparatus can be suitably used for forming high resolution interference fringes on a medium. Electron beam drawing apparatus are being widely utilized for drawing mask patterns of semiconductor integrated circuits and have a function of highly precisely scanning an electron beam. Thus, it is possible to draw a pattern of interference fringes according to the arithmetically determined intensity distribution of the interference wave by inputting image data showing the intensity distribution to an electron beam drawing apparatus and operating the apparatus to scan an electron beam accordingly.

However, popular electron beam drawing apparatus only have a function of drawing a binary image by controlling drawing/non-drawing. Therefore, it is necessary to prepare a binary image by binarizing the arithmetically determined intensity distribution and input the binary image data to the electron beam drawing apparatus.

Figure 3B:
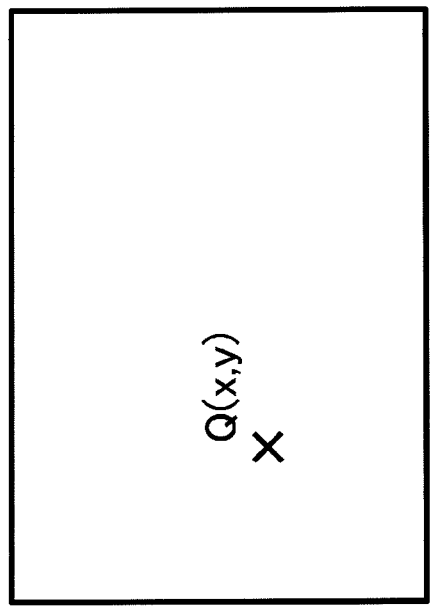
FIGS. 3A and 3B are schematic illustrations of the concept of obtaining a binary image from an interference wave intensity distribution.
Figure 3B:
Figure 3A:
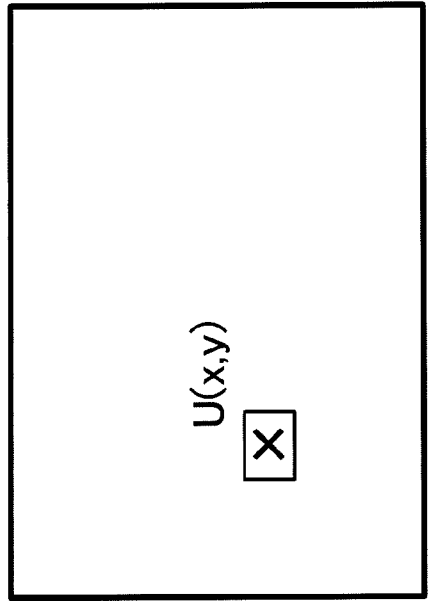

FIGS. 3A and 3B are schematic illustrations of a popular method of recording a pattern of interference fringes by means of a binarization process. As a result of the above-described arithmetic operations, a predetermined interference wave intensity value, or an amplitude intensity of the interference wave, is defined on each arithmetic operation point Q(x, y) on the recording plane 20. For example, a predetermined amplitude intensity value is defined on the arithmetic operation point Q(x, y) shown in FIG. 3A. A predetermined threshold value (e.g., the average value of all the amplitude intensity values distributed on the recording plane 20) is defined for the amplitude intensity value and a pixel value of "1" is given to each arithmetic operation point having an intensity value not less than the threshold value, whereas a pixel value of "0" is given to each arithmetic operation point having an intensity value less than the threshold value. Thus, a pixel value of "1" of "0" is defined for the arithmetic operation point Q(x, y) shown in FIG. 3A.

Then, as shown in FIG. 3B, a unit region U(x, y) is defined at the position of the arithmetic operation point Q(x, y) and the unit region U(x, y) is treated as a pixel having a pixel value of "1" or "0" to consequently obtain a predetermined binary image. Interference fringes can be drawn as a physical binary image by giving the data of the binary image to an electron beam drawing apparatus and driving the apparatus to draw an image. Actually, holograms on the surface of which interference fringes are formed as an undulated structure can be prepared on a mass production basis typically by preparing an embossed plate according to such physically drawn interference fringes and conducting an embossing process using the embossed plate.

Figure 4:
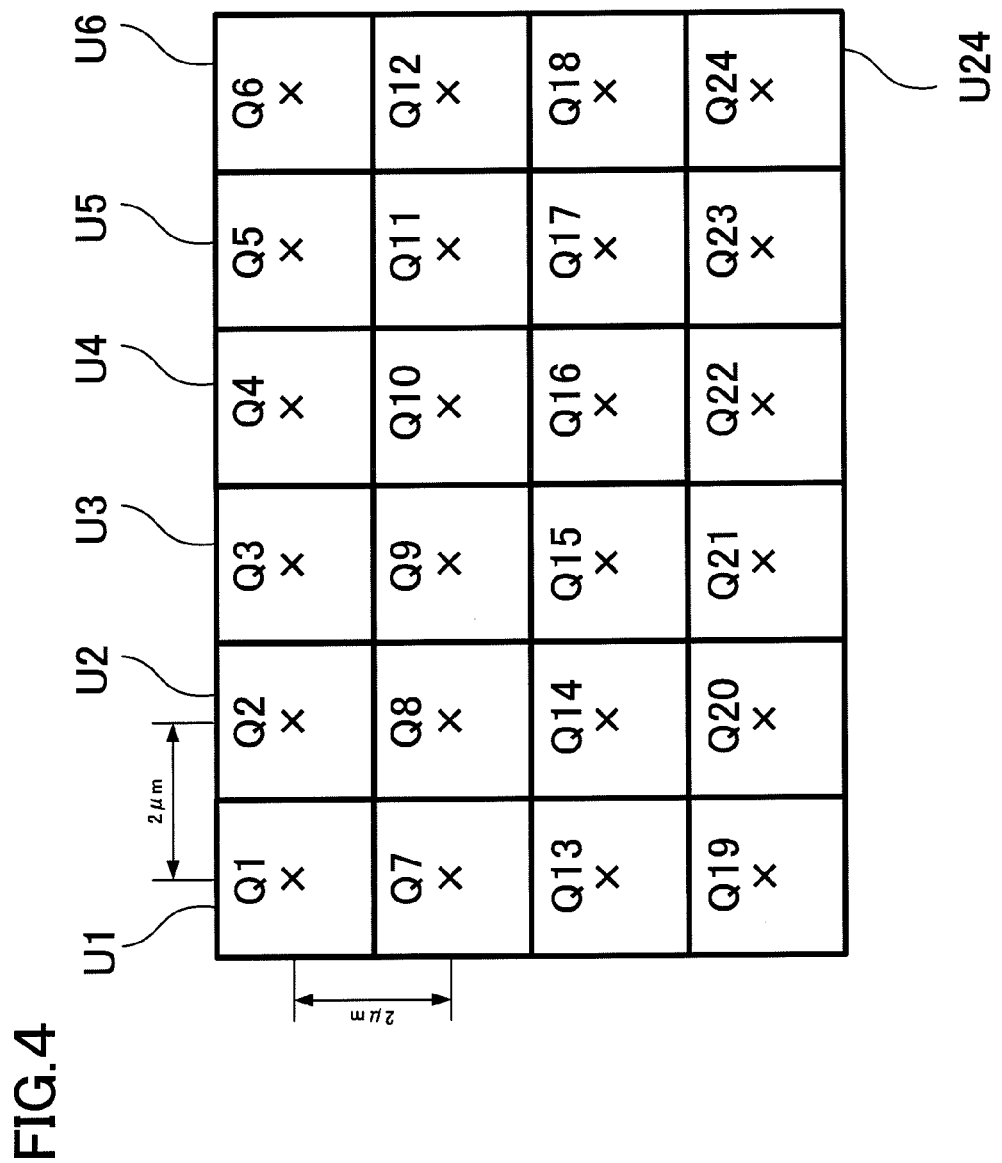
FIG. 4 is a schematic illustration of regions arranged in a lattice on a recording plane.

FIG. 4 shows unit regions U1 through U24 that are two-dimensionally arranged on the recording plane 20. Each unit region is a square having 2 μm sides in the illustrated instance because the arithmetic operation points Q1 through Q24 defined on the recording plane 20 are arranged at a pitch of 2 μm both longitudinally and transversally. Since arithmetic operation points defined on the recording plane 20 function as sample points of intensity of interference wave, they may well be arranged at a pitch that is optimum for recording interference fringes by taking the pitch of arrangement of the point light sources defined on the original image 10, the distance between the original image 10 and the recording plane 20 and optically selected conditions including the direction and the wavelength of the reference light R into consideration. While the pitch of arrangement of arithmetic operation points Q is 2 μm both longitudinally and transversally in the instance illustrated in FIG. 4, the longitudinal pitch may be different from the transversal pitch (to make each unit region rectangular in this case). While unit regions are arranged on respective arithmetic operation points so as to make the central point of each square unit region agree with the corresponding arithmetic operation point in the instance of FIG. 4, the positional relationship between the arithmetic operation points and the unit regions is not necessarily be so. For example, the upper left corner point of each unit region may alternatively be selected as reference point and each unit region may be arranged so as to make the reference point thereof at the upper left corner point agree with an arithmetic operation point.

As described above, a predetermined interference wave intensity value is arithmetically determined for each of the arithmetic operation points Q1 through Q24 shown in FIG. 4. With any known general technique, each intensity value is binarized on the basis of a predetermined threshold value and converted into a pixel value of either "1" or "0". Therefore, a binary image of black and white is obtained when a unit region U that includes an arithmetic operation point Q for which a pixel value of "1" is defined is treated as a white pixel and a unit region U that includes an arithmetic operation point Q for which a pixel value of "0" is defined is treated as a black pixel. Then, a hologram medium is obtained by forming a physical undulated structure having recesses of white pixels and projections of black pixels (or vice versa) on the basis of the binary image.

However, such a general technique of preparing a computer hologram, only a white pixel or a black pixel is assigned to each unit region and the gradation values of the interference wave intensities that are obtained by arithmetic operations will be lost.

Therefore, in this embodiment, a plurality of binary patterns is prepared by dividing a unit region into a first region having a first pixel value and a second region having a second pixel value to define a binary pattern and modifying "the occupancy ratio of the first region relative to the unit region" of the defined binary pattern and a binary pattern having the occupancy ratio ("the occupancy ratio of the first region relative to the unit region") that corresponds to the interference wave intensity of an arithmetic operation point is assigned to the position of the arithmetic operation point.

Figure 5:
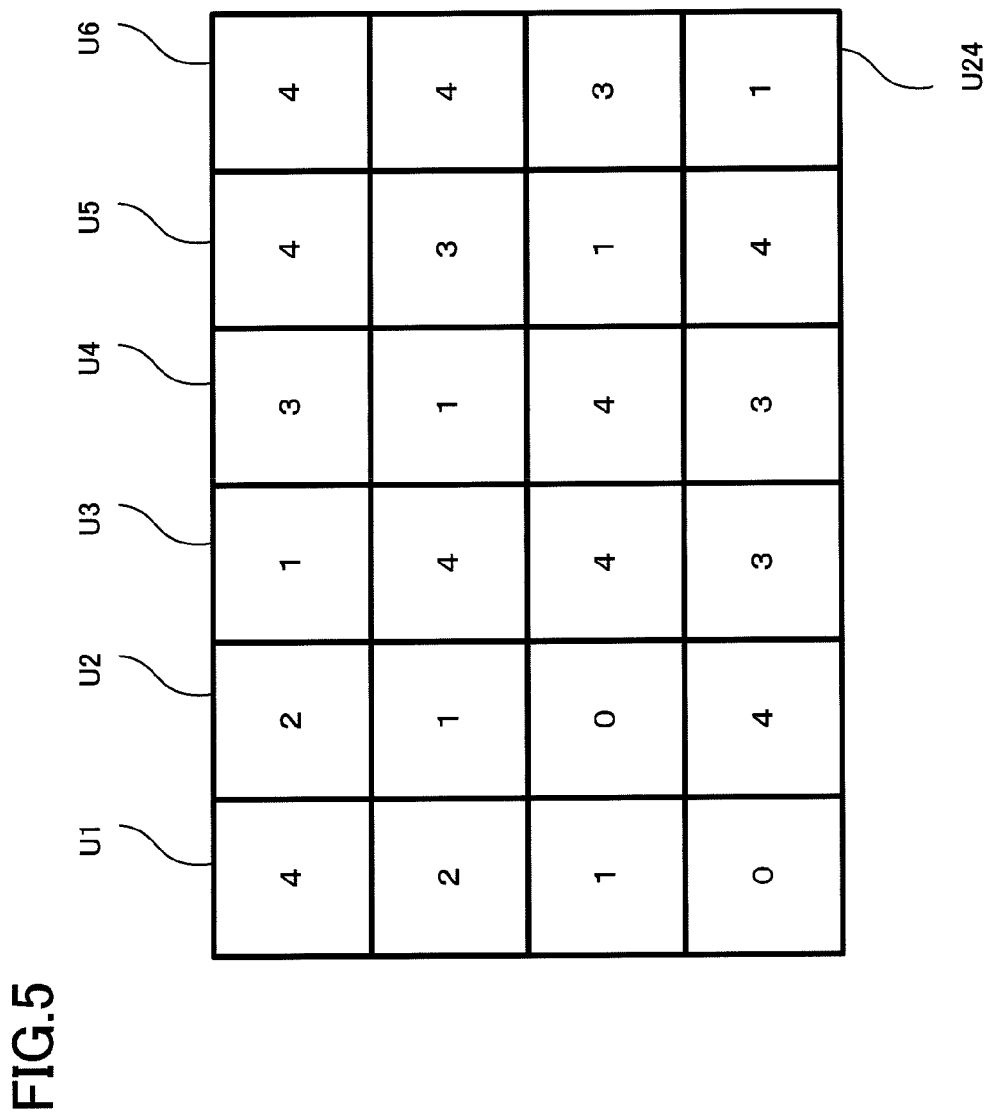
FIG. 5 is a schematic illustration of the quinarized interference fringe intensity of each region.
Figure 6:
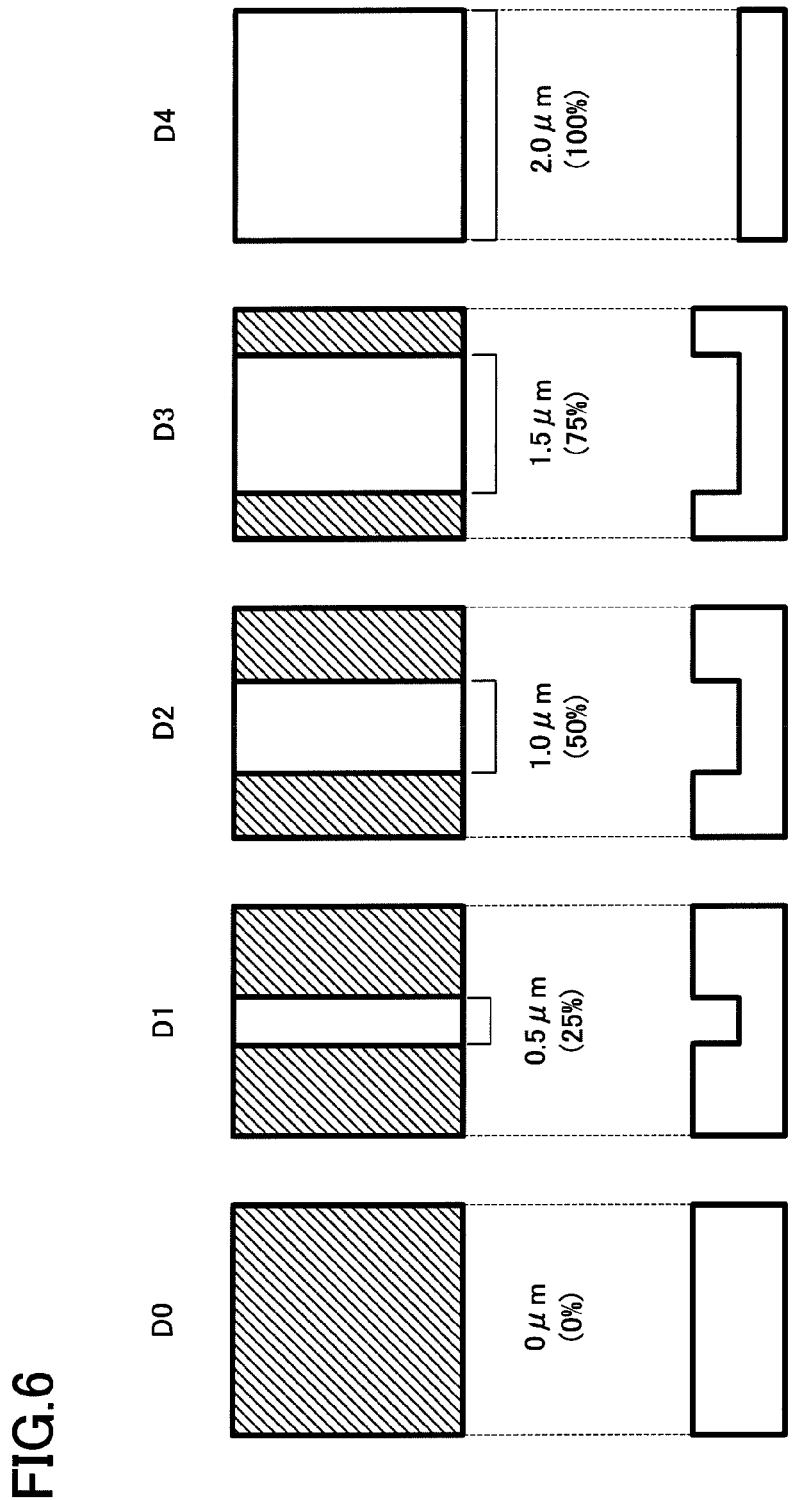
FIG. 6 is a schematic illustration of an arrangement of binary patterns.
Figure 7A:
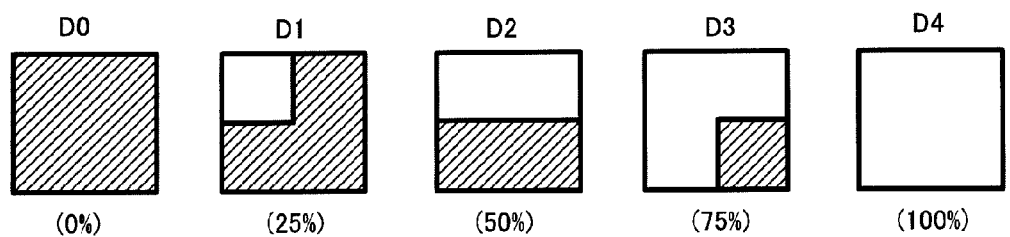
FIGS. 7A, 7B and 7C are a schematic illustration of another arrangement of binary patterns.
Figure 7B:
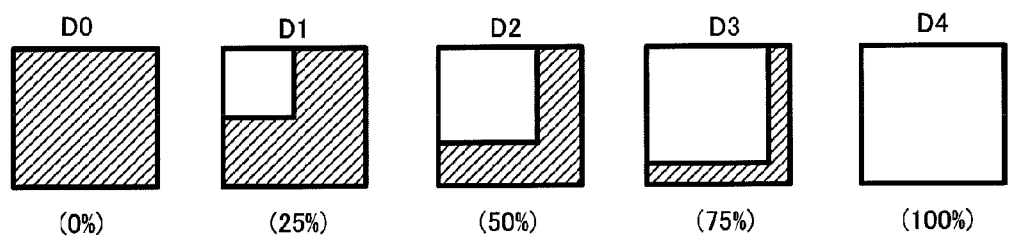
Figure 7C:
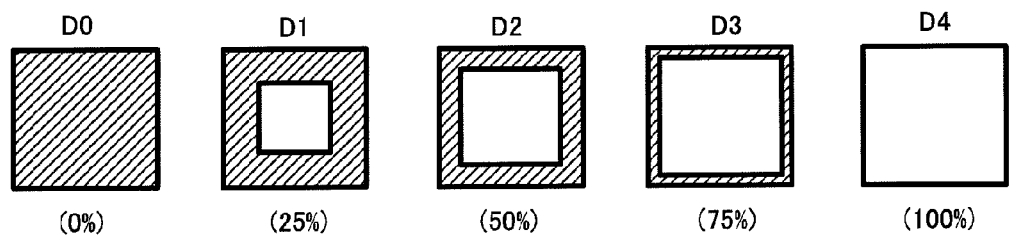

Firstly, as shown in FIG. 5, a particular gradation value is assigned to each pixel according to the intensity of interference wave. In this embodiment, binary patterns D0 through D4 of five different types are prepared in advance as shown in FIG. 6. Each of the binary patterns is a pattern formed in the inside of a unit region of a square having 2 μm sides by a first region having a first pixel value of "1" (white part in the drawing) and a second region having a second pixel value of "0" (hatched part in the drawing). Note, however, that the binary pattern D0 includes only a second region and the binary pattern D4 includes only a first region, although they are regarded to be patterns having a region whose area is equal to 0. Now, by paying attention to "the occupancy ratio of the first region (white part) relative to the unit region (entire square)", it will be found that the occupancy ratios of the binary patterns D0, D1, D2, D3 and D4 are respectively 0%, 25%, 50%, 75% and 100%.

In each of the binary patterns, the first region (white part) is formed by a rectangle having a height equal to the height of the unit region (entire square) and a width that corresponds to the predetermined occupancy ratio and the rectangle that constitutes the first region is arranged at the transversally central position of the unit region. The remaining part of the unit region left after the first region is arranged is the second region (hatched part). Binary patterns that can be used for this embodiment are not limited to those shown in FIG. 6 and any set of binary patterns shown in FIGS. 7A through 7C or some other sets of binary patterns may alternatively be used. Still alternatively, gradation can be expressed by making different refractive indexes respectively correspond to different binary patterns.

Figure 8:
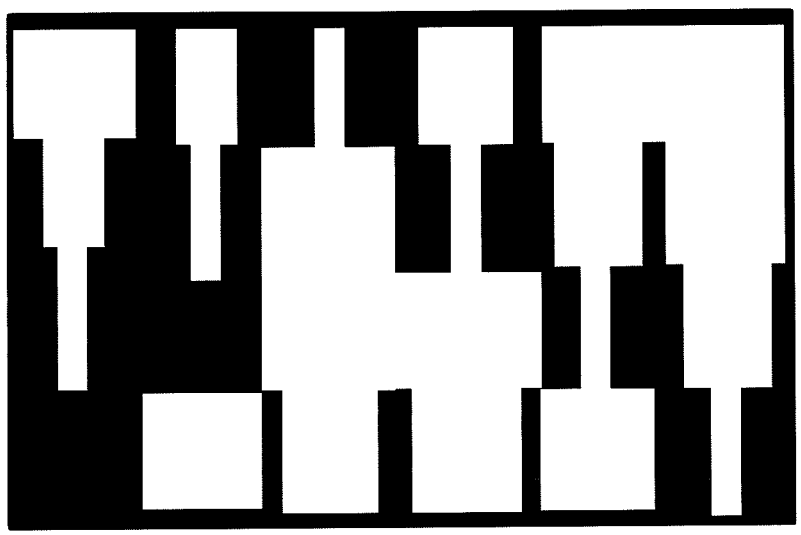
FIG. 8 is a schematic illustration of a binary image obtained by this embodiment.

Now, the interference wave intensity of each arithmetic operation point can be expressed by the gradation of five different tones by selectively assigning one of the binary patterns D0 through D4 of the five different types that are prepared in this way to each of the arithmetic operation points on the recording plane. In the instance shown in FIG. 5, the interference wave intensity of each arithmetic operation point is given as one of the five intensity values of 0 through 4. To assign the binary patterns D0 through D4 to the five intensity values, it is sufficient to define the corresponding relationships in advance. For example, the binary pattern D0 may be assigned to the intensity value of 0 and the binary pattern D1 may be assigned to the intensity value of 1 while the binary pattern D2 may be assigned to the intensity value of 2 and the remaining binary patterns D3 and D4 may be assigned respectively to the intensity values of 3 and 4. FIG. 8 shows a binary image obtained as an example by assigning binary patterns to the corresponding intensity values shown in FIG. 5 based on the corresponding relationships. As compared with a binary image obtained by a general method, they are both binary images but the interference wave intensity value at each arithmetic operation point is expressed with gradation information.

When a binary image as shown in FIG. 8 is obtained, a computer hologram medium that can reproduce a high quality gradation image is obtained by forming physical interference fringes on a medium. More specifically, an embossed structure where a projection represents a black part and a recess represents a white part (or vice versa) in FIG. 8 is formed on a medium. In reality, such a binary image is preferably formed by scanning an electron beam by means of an electron beam drawing apparatus. Currently, the spot diameter of the electron beam that is scanned by a popular electron beam drawing apparatus is about 0.05 μm and the scanning accuracy is about 0.01 μm so that a binary pattern having a dimensional arrangement as shown in FIG. 6 can satisfactorily be drawn. Of course, the processing steps until obtaining a binary image as shown in FIG. 8 are executed by a computer where a predetermined program is installed and a physical drawing process is actually executed by giving the binary image data prepared by the computer to an electron beam drawing apparatus.

While the intensity distribution of an interference wave, or the distribution of interference fringes, is employed to prepare a computer generated hologram 1 in this embodiment, a complex amplitude distribution may be applied without causing object light to interfere with reference light.

For example, instead of the method of recording with the interference fringes obtained by interference of object light and reference light as described above, a method of preparing a three-dimensional cell having grooves over the entire surface thereof and recording the phase and the amplitude respectively by the depth of the groove and the width of the groove as described in Patent Documents 3 and 4 in order to record the amplitude and the phase of object light at an arithmetic operation point Q.

Still alternatively, the amplitude and the phase may be recorded by the method of A. W. Lohmann et al. or the method of Lee described in Non-Patent Document 1.

Figure 9A:
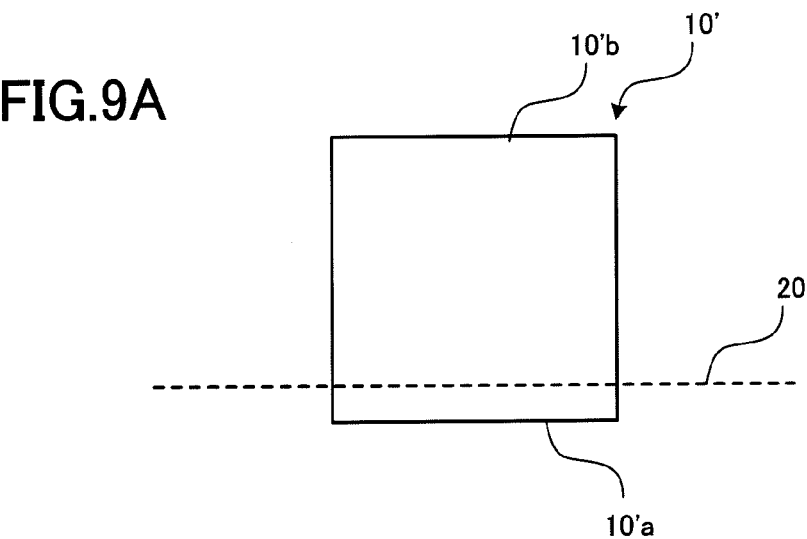
FIGS. 9A and 9B are schematic illustrations of the positional relationship between a three-dimensional image 10' that operates as original image and a hologram recording plane 20 when arithmetically obtaining a computer generated hologram 1 for the first embodiment of the present invention.
Figure 9B:
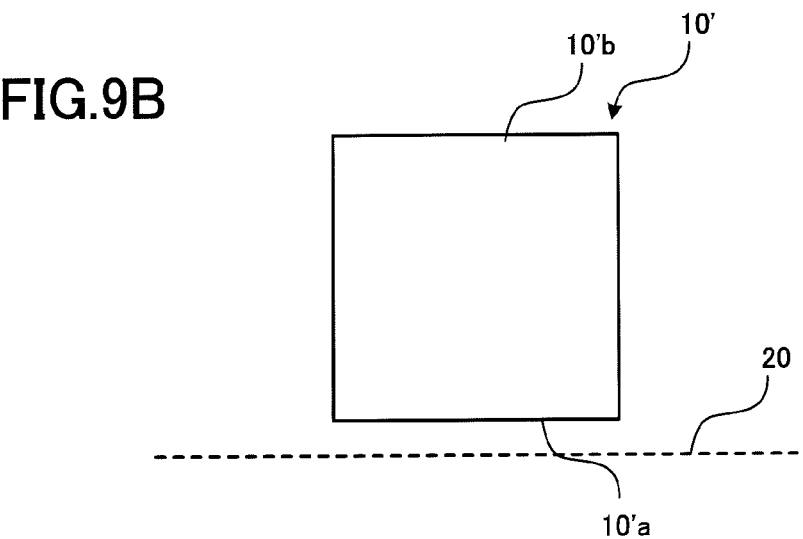

Now, a computer generated hologram 1 according to the first embodiment of the present invention will be described below. FIGS. 9A and 9B are schematic illustrations of the positional relationship between a three-dimensional image 10' that operates as original image and a hologram recording plane 20 when arithmetically obtaining the computer generated hologram 1 according to the first embodiment.

FIG. 9A shows an instance where the three-dimensional image 10' is arranged in front of the hologram recording plane 20 and FIG. 9B shows an instance where the three-dimensional image 10' is arranged at the back of the hologram recording plane 20.

The front-most part 10' a of the three-dimensional image 10' is arranged near, namely within ±1 mm from, the hologram recording plane 20, for the computer generated hologram 1 of the first embodiment. Note that it is not necessary to be rigorously within ±1 mm. In other words, it is sufficient for that part to be within about ±1 mm.

Preferably, the rear-most part 10'b of the three-dimensional image 10' is arranged at 2 mm to 20 mm at the back of the hologram recording plane 20. Note that it is not necessary to be rigorously at 2 mm to 20 mm. In other words, it is sufficient for that part to be at about 2 mm to 20 mm.

Preferably, the depth from the front-most part 10' a to the rear-most part 10' b of the three-dimensional image 10' is not less than 2 mm. Note that it is not necessary to be rigorously not less than 2 mm. In other words, it is sufficient for the depth to be not less than about 2 mm.

It is possible to provide a hologram, with a simple method, that is excellent from the viewpoint of design and security and offers a comfortable appearance of an image and a three-dimensional impression like those of a real object by selecting such a positional relationship between the three-dimensional image 10' that operates as original image 10 and the hologram recording plane 20 when arithmetically obtaining the computer generated hologram 1.

Figure 10:
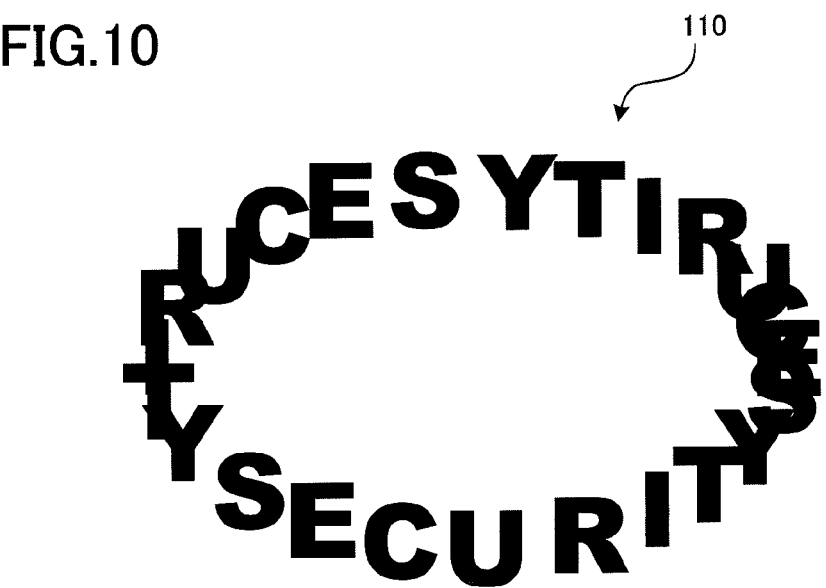
FIG. 10 is a schematic illustration of a ring-shaped character string 110 that operates as original image 10 when arithmetically obtaining a computer generated hologram 1 for the second embodiment of the present invention.

Now, a computer generated hologram 1 according to the second embodiment of the present invention will be described below. FIG. 10 is a schematic illustration of a ring-shaped character string 110 that operates as original image 10 when arithmetically obtaining the computer generated hologram 1 for the second embodiment.

The ring-shaped character string 110 that is employed as original image 10 of the second embodiment is a character string arranged in air to show a ring-shape. It is believed that a hologram using such a ring-shaped character string 110 as object to be imaged provides a high anti-forgery effect because a real object cannot be prepared as object to be imaged.

Figure 23:
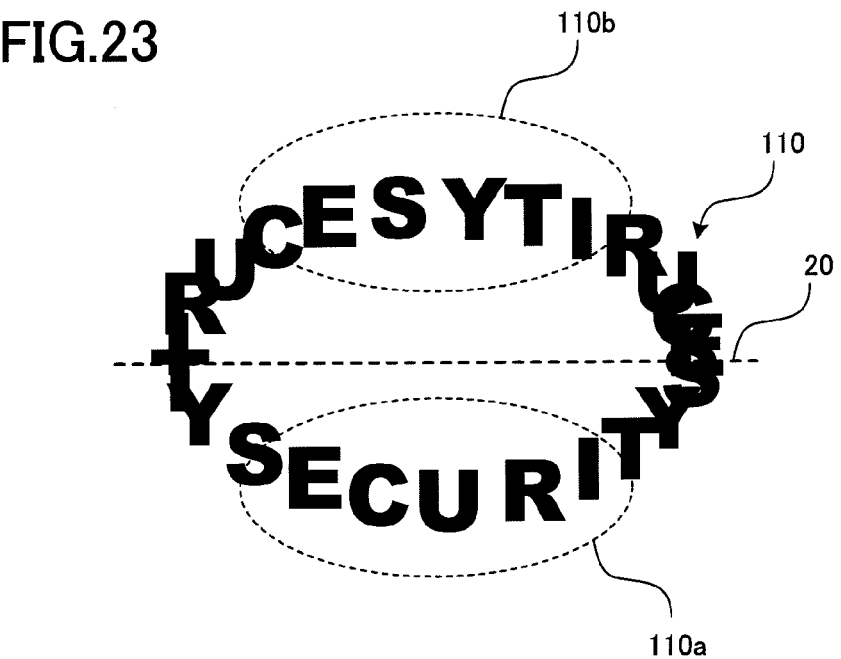
FIG. 23 is a schematic illustration of a ring-shaped character string 110 arranged as in the case of the prior art.

According to a known idea of preparing a hologram providing a high anti-forgery effect, while emphasizing a strange appearance of the hologram, as shown in FIG. 23, the ring-shaped character string 110 is arranged so as to show a projection toward the front side and a depth toward the rear side by respective quantities that are substantially equal to each other relative to the hologram recording plane 20.

However, when the ring-shaped character string 110 is arranged so as to project frontward and rearward by a substantially same quantity relative to the hologram recording plane 20, any extreme blur is suppressed as a whole, but since the front-most part 110a and the rear-most part 110b of the ring-shaped character string where characters do not overlap and can be read out as character string are located remotest from the hologram recording plane 20, the character string is apt to blur and difficult to be clearly observed in the computer generated hologram 1.

Figure 11A:
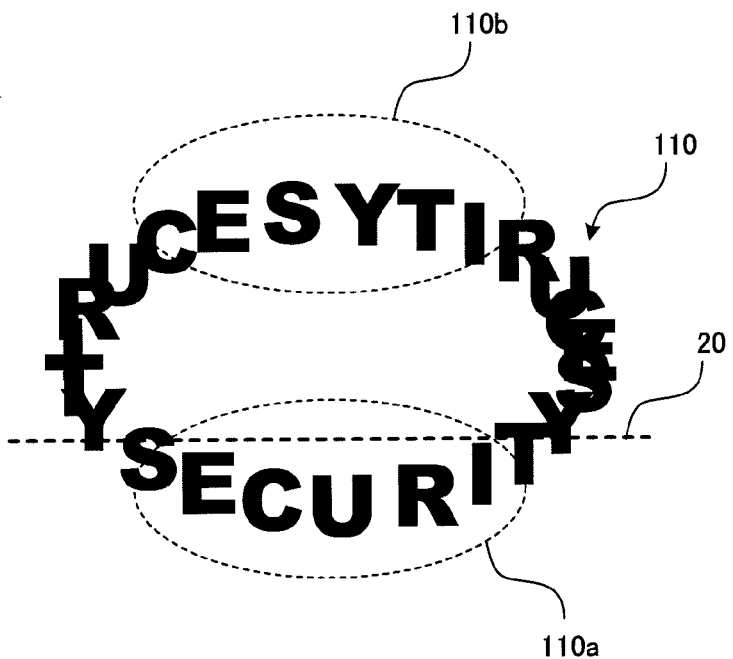
FIGS. 11A and 11B are schematic illustrations of the positional relationship between a ring-shaped character string 110 that operates as original image and a hologram recording plane 20 when arithmetically obtaining a computer generated hologram 1 for the second embodiment of the present invention.
Figure 11B:
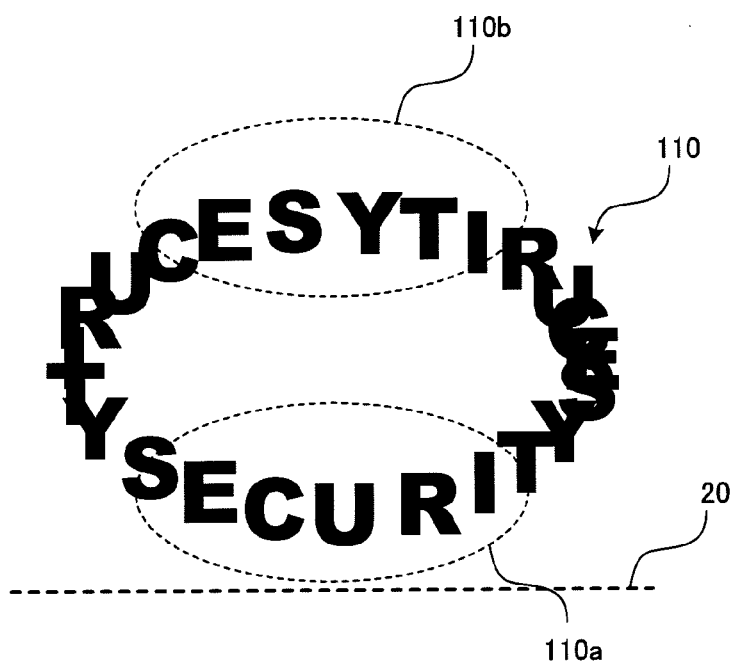

FIGS. 11A and 11B are a schematic illustrations of the positional relationship between the ring-shaped character string 110 that operates as original image 10 and the hologram recording plane 20 when arithmetically obtaining the computer generated hologram 1 for the second embodiment.

FIG. 11A shows an instance where the ring-shaped character string 110 is arranged in front of the hologram recording plane 20 and FIG. 11B shows an instance where the ring-shaped character string 110 is arranged at the back of the hologram recording plane 20.

The reproduced image of a computer generated hologram was simulated by the method described in Japanese Patent Application No. 2008-160136 in order to define an appropriate depth of arrangement of the characters that are to be arranged. The selected object was letter "S" in the ring-shaped character string 110. The typical dimension of characters and graphics is expressed as H here. For example, in the case of "S" of this embodiment, the height of the character "S" from the bottom to the top thereof is equal to the typical dimension H. The depth-directional arrangement position of the character (the distance from the hologram plane) is expressed by Z.

Figure 12:
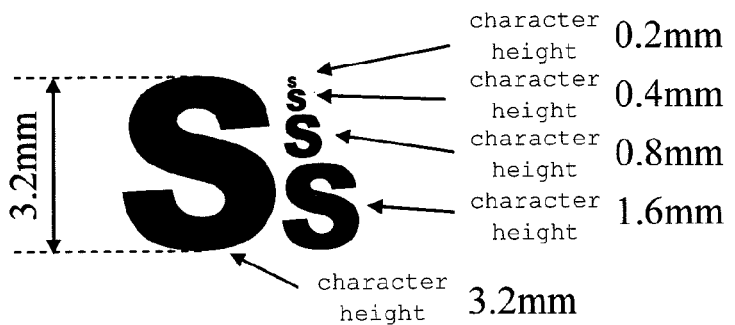
FIG. 12 is a schematic illustration of the heights of characters.

As shown in FIG. 12, five character heights of 0.2 mm, 0.4 mm, 0.8 mm, 1.6 mm and 3.2 mm were selected. As for the depth-directional arrangement position, seventeen values of 1.6 mm, 0.8 mm, 0.4 mm, −0.2 mm, −0.3 mm, −0.4 mm, −0.6 mm, −0.8 mm, −1.2 mm, −1.6 mm, −2.4 mm, −3.2 mm, −4.8 mm, −6.4 mm, −9.6 mm, −19.2 mm and −25.6 mm were selected. The positions at the front side of the hologram plane (at the observer's side) show positive values, whereas the positions at the rear side of the hologram plane (at the side opposite to the observer) show negative values.

Firstly, the results of a simulation where a light source having a width of 300 mm was arranged 2 m above and 2 m behind a hologram to determine the range in which characters can be read out under the light from a large light source are shown in FIGS. 13A through 15G.

Figure 13A:
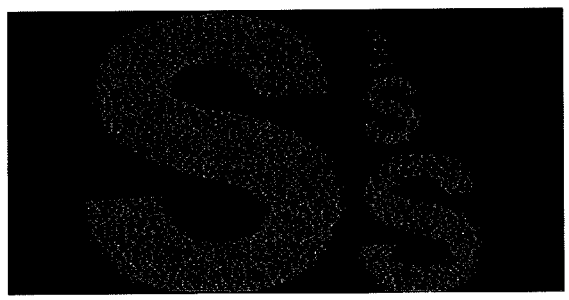
FIGS. 13A through 13C are schematic illustrations of the results of a simulation obtained when characters are arranged at the front side relative to a hologram plane by using a large light source.
Figure 13B:
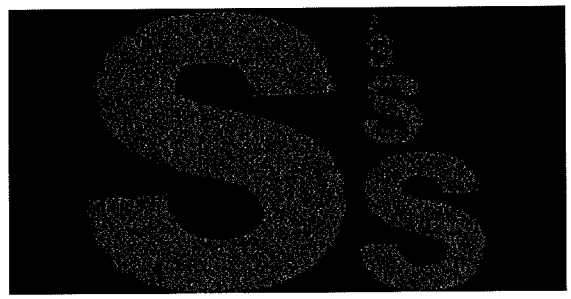
Figure 13C:
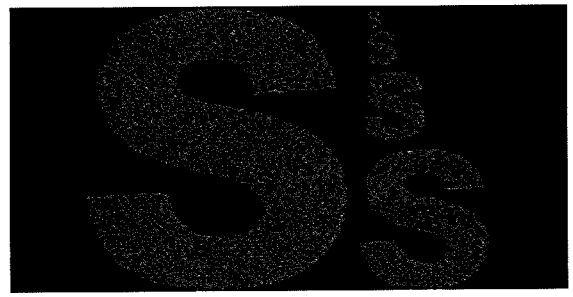
Figure 14A:
FIGS. 14A through 14G are schematic illustrations of the results of a simulation obtained when characters are arranged at the rear side relative to a hologram plane by using a large light source.
Figure 14E:
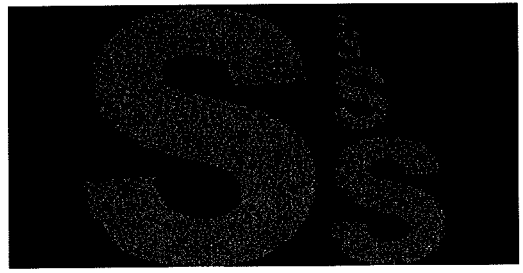
Figure 14B:
Figure 14F:
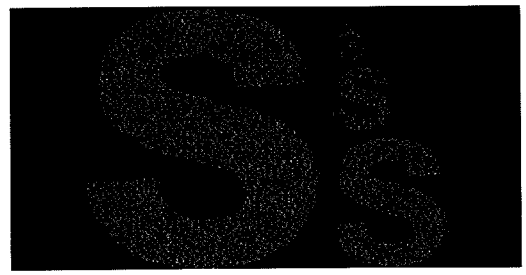
Figure 14C:
Figure 14G:
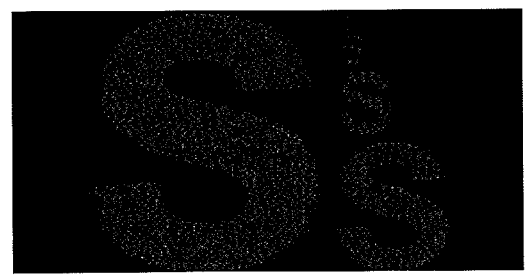
Figure 14D:
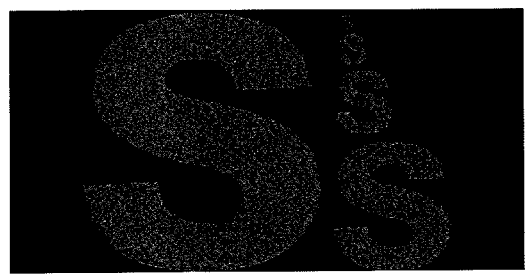
Figure 15A:
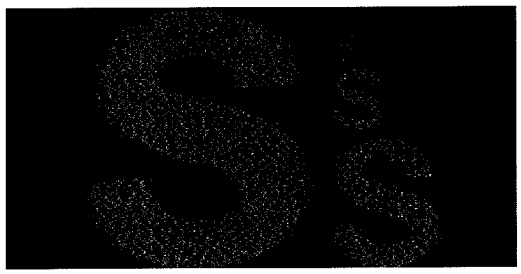
FIGS. 15A through 15G are schematic illustrations of the results of a simulation obtained when characters are arranged at the rear side relative to a hologram plane by using a large light source.
Figure 15E:
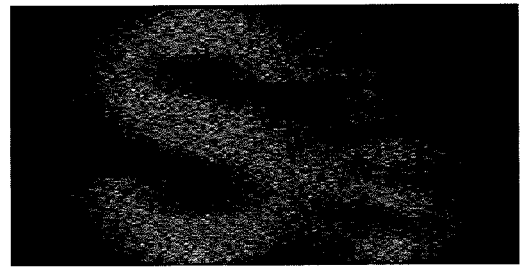
Figure 15B:
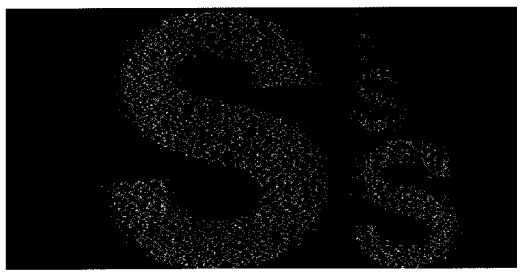
Figure 15F:
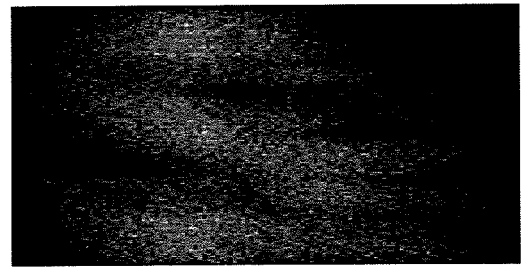
Figure 15C:
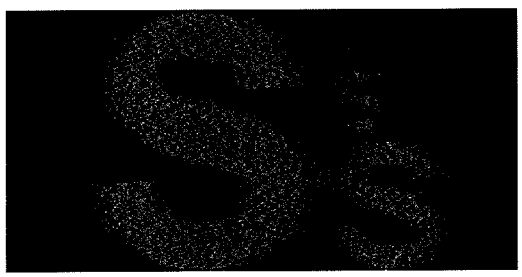
Figure 15G:
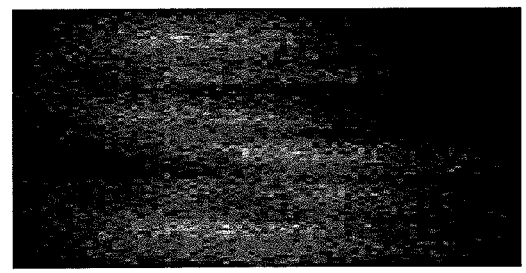
Figure 15D:
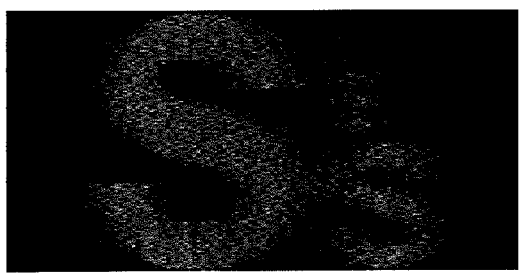

FIGS. 13A through 13C illustrate instances where characters were arranged at the front side of the hologram plane. More specifically, FIGS. 13A through 13C shows instances where characters were arranged at 1.6 mm, 0.8 mm and 0.4 mm from the hologram plane at the front side.

FIGS. 14 and 15 illustrate instances where characters were arranged at the rear side of the hologram plane.

More specifically, FIGS. 14A through 14G show instances where characters were arranged at −0.2 mm, −0.3 mm, −0.4 mm, −0.6 mm, −0.8 mm, −1.2 mm and −1.6 mm from the hologram plane at the rear side.

FIGS. 15A through 15G show instances where characters were arranged respectively at −2.4 mm, −3.2 mm, −4.8 mm, −6.4 mm, −9.6 mm, −19.2 mm and −25.6 mm from the hologram plane at the rear side.

FIG. 16 is a table of readabilities of characters determined for each character height and each depth-directional arrangement position on the basis of the reproduced simulation images of FIGS. 13A through 15G. "◯" was given when the character "S" could be read out, whereas "x" is given when the character "S" could not be read out. As shown in FIG. 16, a character can be readout in the range of $-4 \leq Z/H \leq 4$, whereas a character cannot be read out when $Z/H \leq -6$ and when $Z/H \geq 6$.

A character string having a depth is employed as original image 10 for the computer generated hologram 1 of the second embodiment. The depth-directional arrangement position Zf of the front-most part 110a of the character string 110 is so selected as to satisfy the conditional formula (1) near the hologram recording plane 20:

$$-4 \leq Zf/H \leq 4 \quad (1),$$

where Zf is the depth-directional arrangement position of the front-most part of the ring-shaped character string and
H is the height of the ring-shaped character string.

Particularly, a ring-shaped character string 110 having a depth is employed and the depth-directional arrangement position Zf of the front-most part 110a of the ring-shaped character string 110 is so selected as to satisfy the conditional formula (1) near the hologram recording plane 20:

$$-4 \leq Zf/H \leq 4 \quad (1),$$

where Zf is the depth-directional arrangement position of the front-most part of the ring-shaped character string and
H is the height of the ring-shaped character string.

Preferably, in order to make an object observed as closer to the observer less blurred relative to an object observed as more remote from the observer, the depth-directional arrangement position Zr of the rear-most part 110b of the ring-shaped character string 110 is arranged so as to satisfy the conditional formula (2) below:

$$|Zf/H| < -Zr/H \quad (2),$$

where Zf is the depth-directional arrangement position of the front-most part of the ring-shaped character string,
Zr is the depth-directional arrangement position of the rear-most part of the ring-shaped character string,
H is the height of the ring-shaped character string, and
| | is the symbol for expressing an absolute value.

Now, the results of a simulation where the hologram same as the above-described one was irradiated with parallel light in order to determine the range in which characters can be read out under the light from an appropriate light source are shown in FIGS. 17 through 19.

Figure 17A:
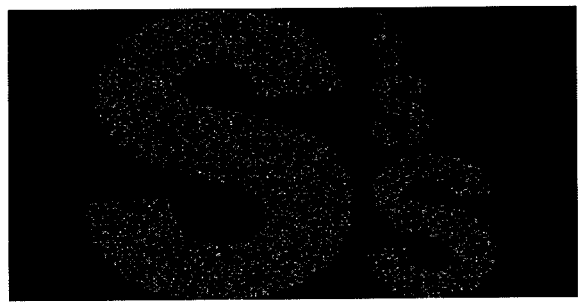
FIGS. 17A through 17C are schematic illustrations of the results of a simulation obtained when characters are arranged at the front side relative to a hologram plane by using parallel light.
Figure 17B:
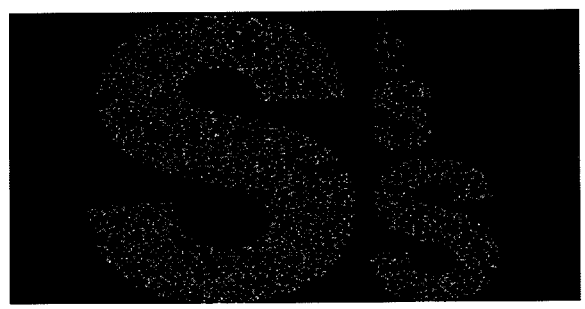
Figure 17C:
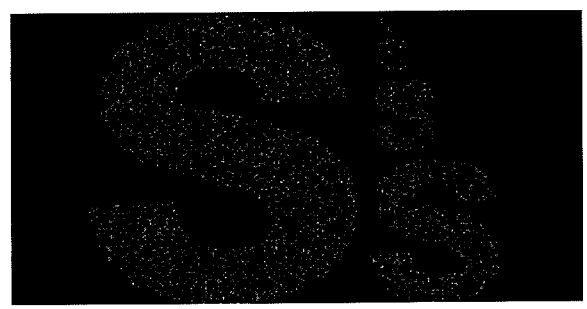
Figure 18A:
FIGS. 18A through 18G are schematic illustrations of the results of a simulation obtained when characters are arranged at the rear side relative to a hologram plane by using parallel light.
Figure 18E:
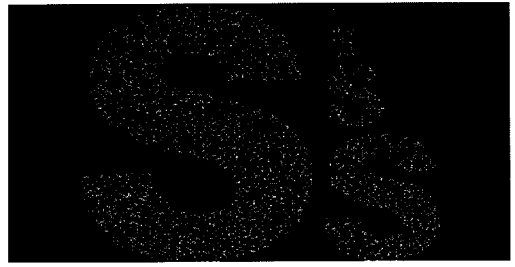
Figure 18B:
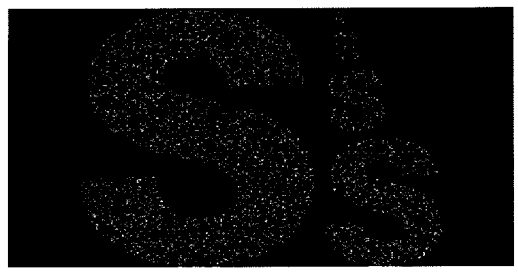
Figure 18F:
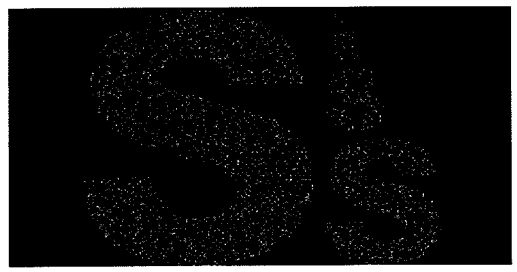
Figure 18C:
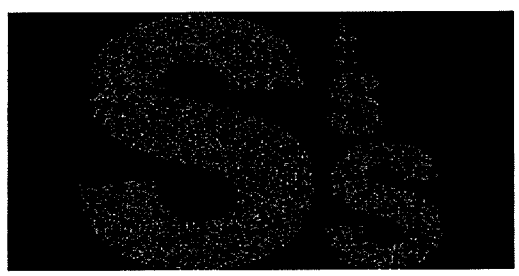
Figure 18G:
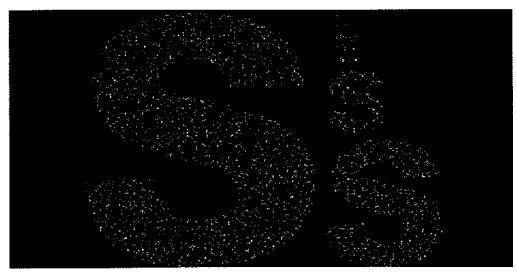
Figure 18D:
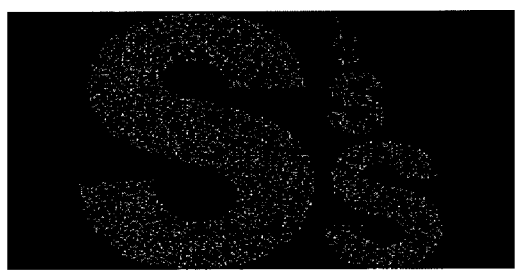
Figure 19A:
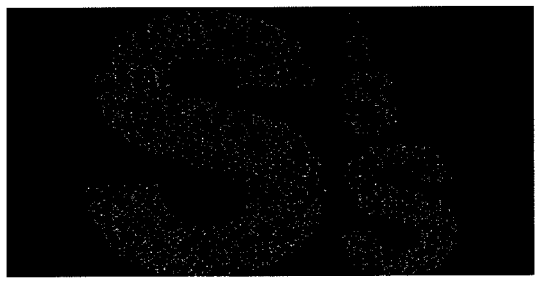
FIG. 19A through 19G are schematic illustrations of the results of a simulation obtained when characters are arranged at the rear side relative to a hologram plane by using parallel light.
Figure 19E:
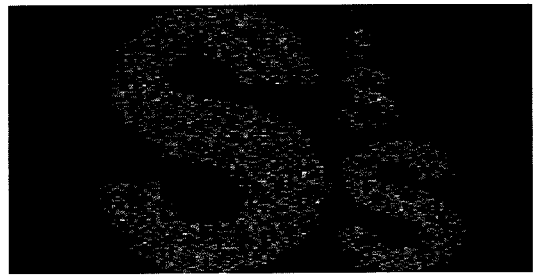
Figure 19B:
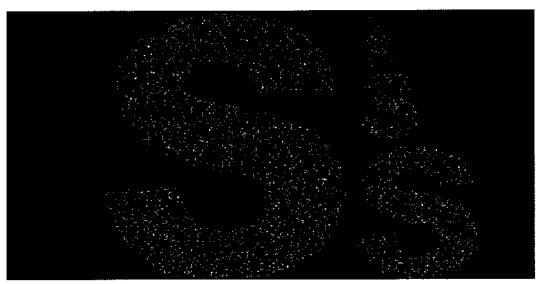
Figure 19F:
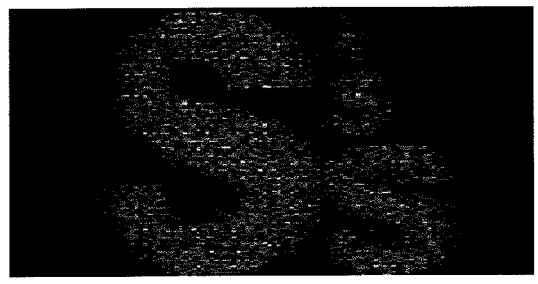
Figure 19C:
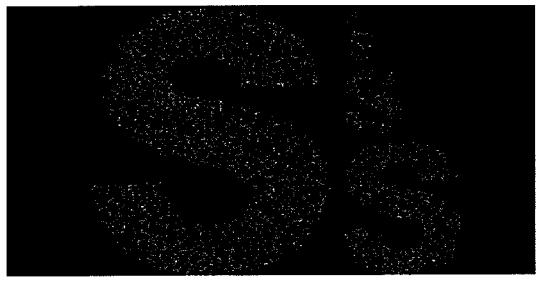
Figure 19G:
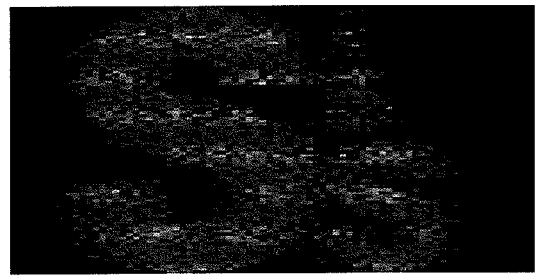
Figure 19D:
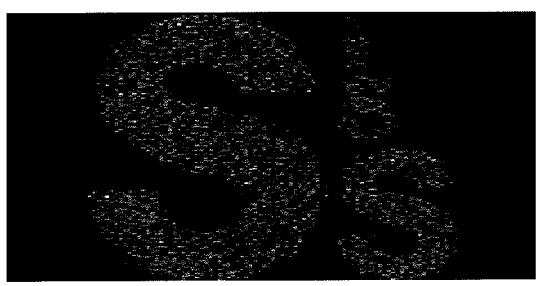

FIGS. 17A through 17C illustrate instances where characters were arranged at the front side of the hologram plane. More specifically, FIGS. 17A through 17C show instances where characters were arranged at 1.6 mm, 0.8 mm and 0.4 mm from the hologram plane at the front side.

FIGS. 18 and 19 illustrate instances where characters were arranged at the rear side of the hologram plane.

More specifically, FIGS. 18A through 18G show instances where characters were arranged at −0.2 mm, −0.3 mm, −0.4 mm, −0.6 mm, −0.8 mm, −1.2 mm and −1.6 mm from the hologram plane at the rear side.

FIGS. 19A through 19G show instances where characters were arranged respectively at −2.4 mm, −3.2 mm, −4.8 mm, −6.4 mm, −9.6 mm, −19.2 mm and −25.6 mm from the hologram plane at the rear side.

FIG. 20 is a table of readabilities of characters "S" determined on the basis of the reproduced simulation images as in the case of using a large light source. Note that the character height of 0.2 mm was omitted from the evaluation of readability because the character could hardly be read out not due to the influence of blur of the image but due to the influence of noise attributable to the technique of the simulation.

From FIG. 20, it will be seen that a character can be read out when $Z/H \geq -16$, whereas a character cannot be read out when $Z/H \leq -24$ if the hologram is irradiated with parallel light. From above, it will be seen that the range in which a character cannot be read out if irradiated with light from a large light source but can be read out if irradiated with light from an appropriate light source such as a point light source or parallel light is expressed by the conditional formula (3) shown below;

$$-16 \leq Z/H \leq -6 \tag{3}$$

where Zr is the depth-directional arrangement position of the ring-shaped character string and H is the height of the ring-shaped character string.

Thus, it is preferable that the depth-directional arrangement position Zr of the rear-most part 110b of the ring-shaped character string 110 is arranged at the rear side of the hologram recording plane 20 so as to satisfy the conditional formula (4) below:

$$-16 \leq Zr/H \leq -6 \tag{4}$$

where Zr is the depth-directional arrangement position of the rear-most part of the ring-shaped character string and H is the height of the ring-shaped character string.

Figure 21:
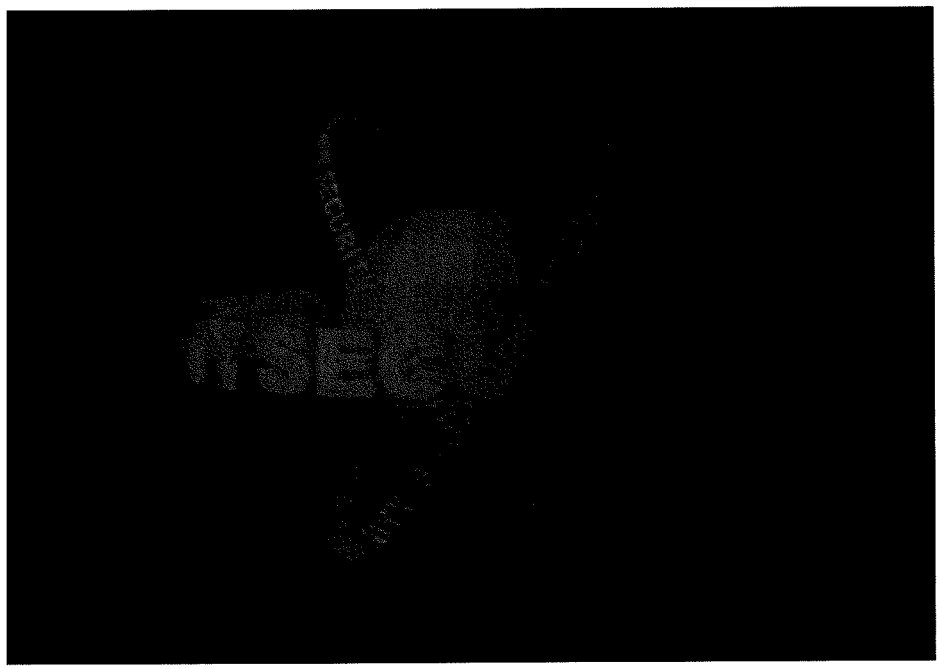
FIG. 21 is an illustration of an actually prepared hologram shown as an example.
Figure 22:
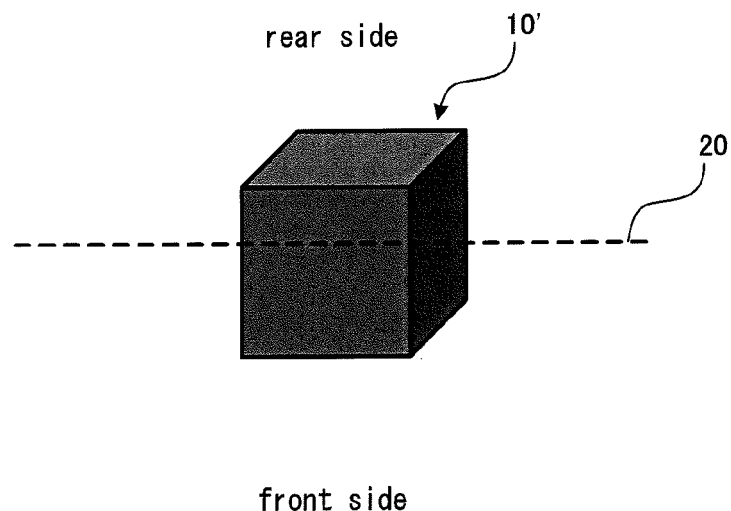
FIG. 22 is a schematic illustration of the prior art.

FIG. 21 is an illustration of an actually prepared hologram shown as an example. The character heights and the depth-direction arrangement positions are specifically shown below:

character string (large): character height 2.2 mm, front side 1.2 mm (Zf/H=0.54), rear side −5.7 mm (Zr/H=−2.59)

character string (medium): character height 0.76 mm, front side 1.1 mm (Zf/H=1.44), rear side −5.5 mm (Zr/H=−7.23)

character string (small): character height 0.55 mm, front side 0.92 mm (Zf/H=1.67), rear side −5.3 mm (Zr/H=−9.63)

As described above, since the original image 10 to be used for obtaining the computer generated hologram 1 by arithmetic operations is formed by the ring-shaped character string 110 that is floating in air, it is possible to prepare a hologram that is excellent from the viewpoint of design and security and has a high anti-forgery effect. Additionally, it is possible to provide a satisfactory three-dimensional impression like a real object by selecting the above-described positional relationship between the ring-shaped character string 110 and the hologram recording plane 20 to obtain a wide depth range. Still additionally, since the front-most character string of a hologram according to the present invention can be read when irradiated by a large light source, the image of the hologram reproduces is easy to observe. Furthermore, the present invention can enhance the anti-forgery effect because character string arranged at the back that cannot be read out when irradiated by a large light source can now be read out when irradiated by an appropriate light source such as a point light source.

Furthermore, a hologram prepared in this way can be used for a security medium such as a card, a brand protection label, a bank note, a passport, a seal, a portable seal or a gift certificate.

Then, as a result, the quality of a security medium can be further improved from the viewpoint of design and security.

While the present invention is described above by way of embodiments that are limited to computer generated holograms, the present invention can be embodied as holographic stereogram prepared by using a computer graphics as original image.

While the present invention is described above by way of embodiments of hologram, the present invention is by no means limited to the embodiments, which can be altered and modified in various different ways.

INDUSTRIAL APPLICABILITY

Thus, according to the present invention, it is possible to prepare a hologram that is excellent from the viewpoint of design and security and has a high anti-forgery effect. Additionally, it is possible to provide a satisfactory three-dimensional impression like a real object because of its wide range of depth. Still additionally, since the front-most character string of a hologram according to the present invention can be read when irradiated by a large light source, the image of the hologram reproduces is easy to observe. Furthermore, the present invention can enhance the anti-forgery effect because a character string arranged at the back that cannot be read out when irradiated by a large light source can now be read out when irradiated by an appropriate light source such as a point light source.

Finally, when a hologram prepared in this way is applied to a security medium, the quality of the security medium can be further improved from the viewpoint of design and security.

What is claimed is:

1. A computer-generated hologram preparation method of preparing a hologram where an original image is recorded as interference fringes on a predetermined recording surface by way of arithmetic operations using a computer, the method comprising:

a step of defining an original image formed as a three-dimensional image, a hologram recording plane for recording the original image and reference light to be irradiated onto the hologram recording plane;

a step of defining using the computer a large number of arithmetic operation points on the hologram recording plane and arithmetically determining the intensity of the interference wave formed by an object light beam emitted from each object and the reference light for each of the arithmetic operation points; and a step of preparing physical interference fringes on a medium on the basis of the intensity distribution of interference wave obtained on the recording plane in the arithmetically determining step;

the front-most part of the three-dimensional image being arranged near the hologram recording plane at the time of defining the original image, wherein an intensity value at each arithmetic operation point is expressed with gradation information.

2. The method according to claim 1, wherein the front-most part of the three-dimensional image as perceived by an observer is arranged within ±1 mm in front of the hologram recording plane.

3. The method according to claim 2, wherein the rear-most part of the three-dimensional image as perceived by the observer is arranged within 2 mm to 20 mm at the back of the hologram recording plane.

4. The method according to claim 3, wherein the range from the front-most part to the rear-most part of the three-dimensional image as perceived by the observer is 2 mm or more.

5. The method according to claim 1, wherein the three-dimensional image is formed by a character string having a depth.

6. The method according to claim 5, wherein the character string is formed by ring-shaped character string.

7. The method according to claim 6, wherein the ring-shaped character string is arranged so as to satisfy the conditional formula (1) below:

$$-4 \leq Zf/H \leq 4 \tag{1}$$

where Zf is the distance of the front-most part of the ring-shaped character string from the hologram as perceived by the observer and H is the height of the ring-shaped character string as perceived by the observer.

8. The method according to claim 7, wherein
the ring-shaped character string is arranged so as to satisfy the conditional formula (2) below:

$$|Zf/H| < -Zr/H \quad (2),$$

where Zf is the distance of the front-most part of the ring-shaped character string from the hologram as perceived by the observer, Zr is the distance of the rear-most part of the ring-shaped character string from the hologram as perceived by the observer, H is the height of the ring-shaped character string as perceived by the observer, and

| | is the symbol for expressing an absolute value.

9. The method according to claim 8, wherein
the ring-shaped character string is arranged so as to satisfy the conditional formula (4) below:

$$16 \leq Zr/H \leq -6 \quad (4),$$

where Zr is the distance of the rear-most part of the ring-shaped character string from the hologram as perceived by the observer and H is the height of the ring-shaped character string as perceived by the observer.

10. A hologram prepared by the hologram preparation method according to claim 1.

11. A security medium that uses the computer-generated hologram according to claim 10.

12. A computer generated hologram, wherein
an image is reproduced with the front-most part arranged within ±1 mm in front of a hologram recording plane and the rear-most part arranged within 2 mm to 20 mm at the back of the hologram recording plane, the range from the front-most part to the rear-most part being 2 mm or more as perceived by an observer the hologram having physical interference fringes on a medium, the interference fringes being based on intensity distribution of interference waves expressed with gradation information.

13. A computer-generated hologram, wherein
an image of a ring-shaped character string satisfying the conditional formulas (1) and (2) shown below is reproduced:

$$-4 \leq Zf/H \leq 4 \quad (1) \text{ and}$$

$$|Zf/H| < -Zr/H \quad (2),$$

where Zf is the distance of the front-most part of the ring-shaped character string from the hologram as perceived by the observer, Zr is the depth-directional arrangement position of the rear-most part of the ring-shaped character string, H is the height of the ring-shaped character string as perceived by the observer, and

| | is the symbol for expressing an absolute value.

14. The hologram according to claim 13, wherein
an image of a ring-shaped character string satisfying the conditional formula (4) shown below is reproduced:

$$-16 \leq Zr/H \leq -6 \quad (4),$$

where Zr is the distance of the
rear-most part of the ring-shaped character string from the hologram as perceived by the observer and H is the height of the ring-shaped character string as perceived by the observer.

* * * * *